United States Patent [19]

Otani et al.

[11] 3,948,775

[45] Apr. 6, 1976

[54] HORIZONTAL PACKED COLUMN CONSISTING OF MULTIPLE CHAMBERS WITH FLUID DISTRIBUTORS

[75] Inventors: Seiya Otani; Takeshi Umemoto; Masazumi Kanaoka; Shoichi Akita, all of Yokohama; Koji Ogawa, Kawasaki; Yoshio Noguchi; Hiroshi Fujita, both of Yokohama, all of Japan

[73] Assignee: Toray Industries, Inc., Tokyo, Japan

[22] Filed: June 24, 1974

[21] Appl. No.: 482,023

Related U.S. Application Data

[63] Continuation of Ser. No. 260,357, June 7, 1972, abandoned.

[52] U.S. Cl. ................ 210/264; 210/284; 210/289
[51] Int. Cl.² ........................................ B01D 29/08
[58] Field of Search.... 210/264, 266, 279, 281–285, 210/287, 323, 335, 289, 314, 317

[56] References Cited
UNITED STATES PATENTS

| | | | |
|---|---|---|---|
| 1,146,363 | 7/1915 | Statham | 210/289 X |
| 1,214,166 | 1/1917 | Janvier | 210/284 X |
| 1,499,600 | 7/1924 | Smith | 210/284 X |
| 1,797,708 | 3/1931 | Apeldorn | 210/283 |
| 2,418,837 | 4/1947 | Houdry | 210/284 X |
| 3,136,719 | 6/1964 | Serra | 210/284 X |
| 3,214,247 | 10/1965 | Broughton | 210/284 X |

*Primary Examiner*—Charles N. Hart
*Assistant Examiner*—Robert H. Spitzer

[57] ABSTRACT

A horizontal multiple-chamber, packed column structure for adsorptive separation process wherein loading and unloading of packing material is facilitated, and efficient, effective contact between the packing material and a fluid passing therethrough is provided by the configuration and placement of a fluid inlet and distributor at one end thereof and fluid collector and fluid outlet at the horizontally opposite end, each chamber also including a plurality of axially extending rods to maintain a relatively uniform packing density of packing material in the chamber.

3 Claims, 15 Drawing Figures

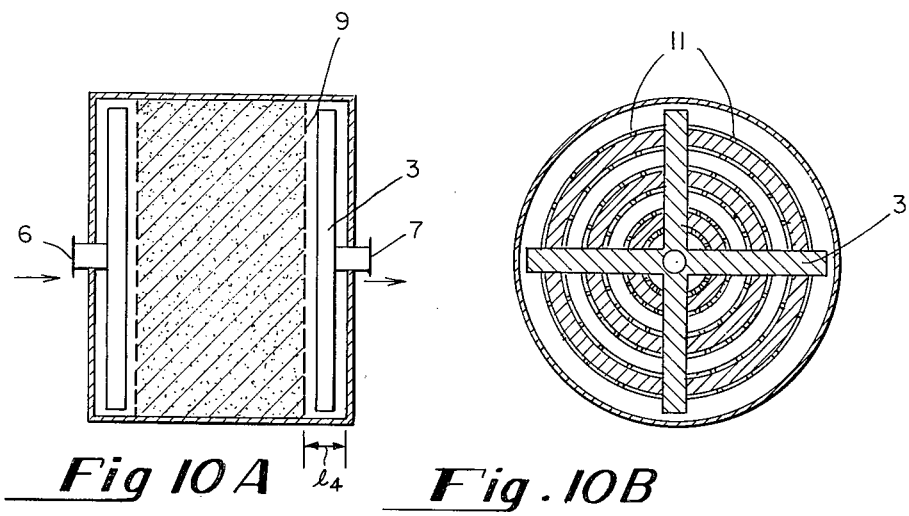
_Fig. 10A_  _Fig. 10B_
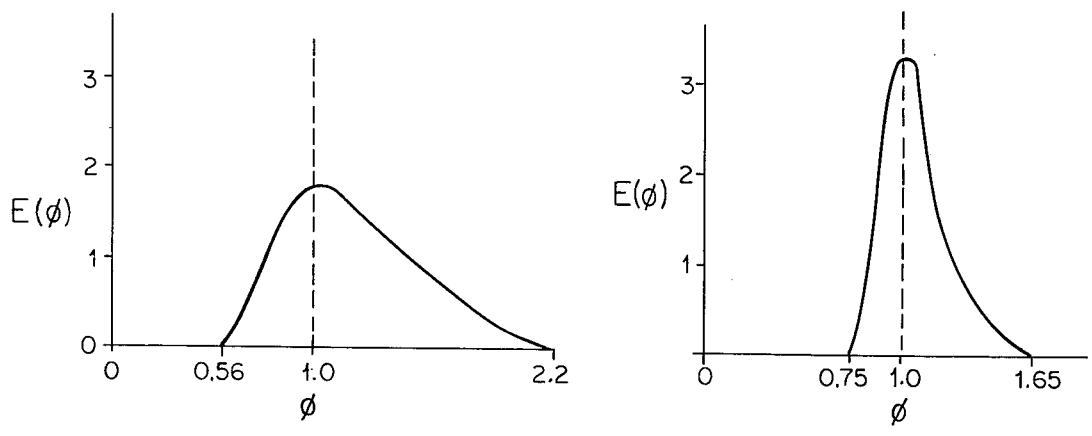
_Fig. 11_  _Fig. 12_
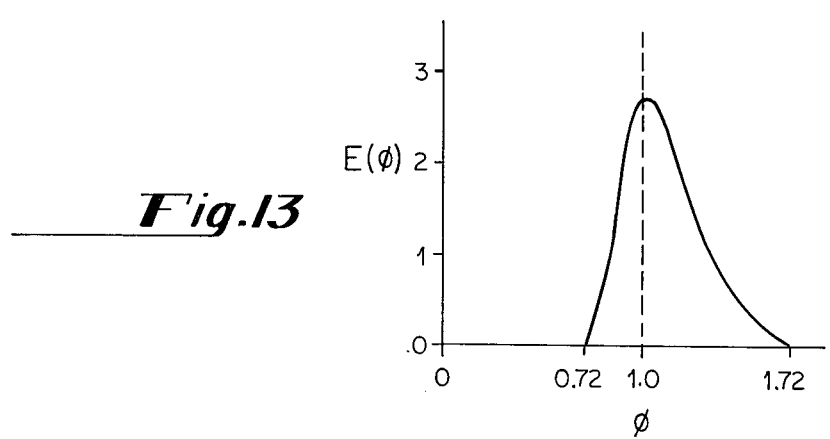
_Fig. 13_

HORIZONTAL PACKED COLUMN CONSISTING OF MULTIPLE CHAMBERS WITH FLUID DISTRIBUTORS

This is a continuation, of application Ser. No. 260,357, filed June 7, 1972, now abandoned.

The present invention relates to a packed column structure for adsorptive separation process. Recently, a separation method utilizing an adsorption process has been commercially established in various fields of separation such as for separation of n-paraffin, olefin, paraxylene and hydrogen. In these processes periodically under a certain time program a continuous adsorption and desorption operation is attained by switching feed, product, raffinate and desorbent lines to and from each chamber of the column. Of particular importance in these processes are uniform flow distribution of fluid through a solid packed bed with which the fluid is to be contacted and a uniform residence time for distribution of fluid within a packed bed including the inside space of fluid distributors. A vertical type of multiple packed column has been extensively used for various purposes, but complete loading and unloading of packing material to and from each chamber of a vertical type column is rather difficult and is both time consuming and expensive.

IN THE DRAWINGS

FIG. 3b is a sectional view taken along the lines 3b — 3b of the device shown in FIG. 3a;

FIGS. 6 – 9 and 11 – 13 are graphs of performance characteristics of the column of the present invention; and FIGS. 10a and 10b are sectional views in detail of a modified form of the present invention.

Figure 1:
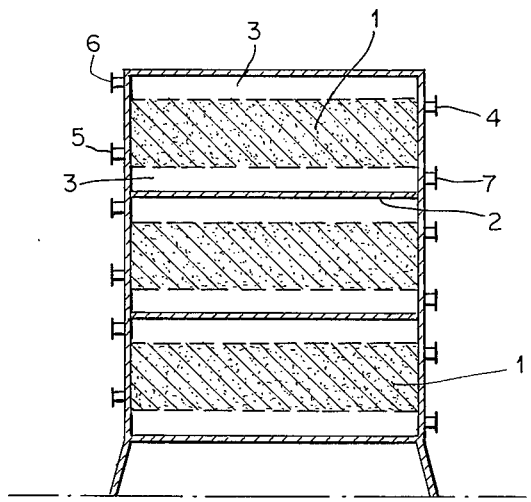
FIG. 1 is a sectional, elevational view of a vertical column of the prior art.

Referring more specifically to the drawings, a vertical packed column is illustrated in FIG. 1, comprising packed beds 1, separating wall 2 between each packed bed chamber, distributors 3 leading to and away from the packed bed, loading holes 4, 5 for packing material, fluid inlet nozzle 6 and fluid outlet nozzle 7.

The loading and unloading of packing material in the vertical type column of FIG. 1 must be done by lateral movement and hence complete loading is difficult to achieve, particularly in the top portion of each chamber. Any incomplete loading can result in a dead space and create a substantial reduction in adsorption performance. Therefore, a complete elimination of dead space resulting from incomplete loading must be accomplished. This may be done by stacking a series of chambers, with a flange in the top and bottom of each chamber, on another chamber which has been already erected and filled with packing material. This method creates a complicated structure, tedious to erect, and is costly. Another method is to separate the adsorption column into individual adsorption vessels. However, it is apparent that over-all equipment cost for these vessels is higher than a single adsorption column consisting of multiple chambers. However, in using a vertical column, it is not unusual to spend more than a month to completely pack a commercial adsorption column consisting of multiple chambers. This results in contamination of the adsorbent by environmental impurities such as moisture in the air and it may significantly impair performance.

From the foregoing, it can be seen that a need exists for a multiple chamber, packed column in which packing material can be loaded and unloaded quickly, easily and independently in each chamber.

Applicants have found that in a horizontal type column, loading and unloading of packing material is made simultaneously and independently in each individual chamber, resulting in not only savings in time but also in expense. In normal circumstances a week is sufficient for complete packing of whole column chambers.

Another advantage of a horizontal type is that the cost for foundation is less expensive than for the vertical type. In a large column as the packed column is filled with heavy packing material, the concentrated weight on the foundation becomes critical. If the horizontal column is adopted, the necessary foundation cost to support the weight may be much less, even though the required area is broader.

In a horizontal type of column structure, the bottom portion tends to be more tightly packed than the top portion of the column because of the weight of packing material itself, causing the flow rate of fluid to be greater at the upper part of the column. This uneven flow rate in the packed bed is undesirable since it decreases the performance of adsorption caused by solid-fluid contact. It has been found by the present inventors that by installing multiple tubes, rods or sticks in the horizontal column along the longitudinal direction of the column, the uniformity of packing can be significantly improved, and hence uniform flow distribution of fluid is obtained.

Figure 2:
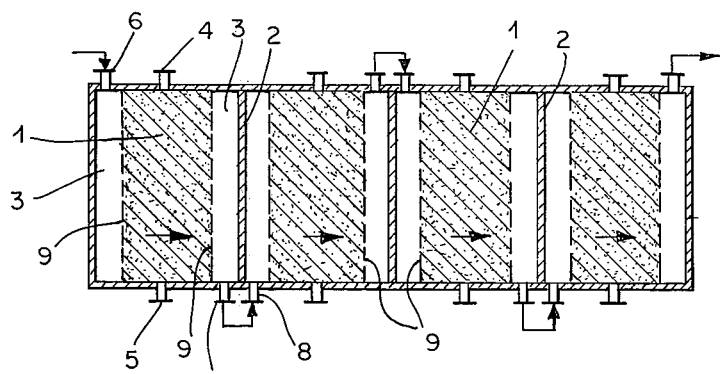
FIG. 2 is an elevational, sectional view of the horizontal column of the present invention.

The structure of the packed column of the present invention is illustrated in FIG. 2. Here a cylindrical column is separated by walls 2 into multiple chambers each having a bed 1 of packing material. The material can be, but is not limited to, adsorbent, such as active carbon, molecular sieve, and silica-gel. Net structure 9 holds the packing material in each chamber, and fluid flows into and out of the packed bed through flow distributors 3 (or more accurately flow distributors and flow collectors) in each chamber. Also seen in each chamber of the horizontal column of FIG. 2 is packing material loading hole 4, unloading hole 5, fluid outlet nozzle 7 fluid inlet nozzle 6, and connecting piping 8 between each chamber.

FIG. 2 is illustrative of the present invention but it should be noted that the connection method between each chamber may be changed in accordance with the process purpose.

Figure 3A:
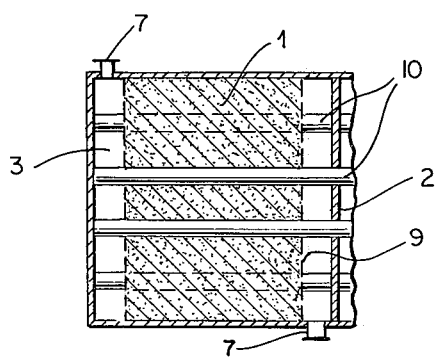
FIG. 3a is an expanded, detailed view at one end of the column shown in FIG. 2.

FIG. 3a shows the structure of multiple distributing sticks or rods in one chamber. Also seen in FIG. 3a are packed bed 1, separating walls 2 between each chamber, fluid distributors 3 in both ends of the chamber (more specifically flow distributors and flow collectors), and holding device 9 for the packing material. Broadly, holding device 9 can be wire mesh, the size of which is small enough to prevent out-flow of packing material and is large enough to let fluid flow through it.

Normally, supporting attachments (not shown) can be used to give mechanical strength to the wire mesh. Also, a plate having many slit holes may be substituted for the wire mesh. Distributing sticks or rods 10 are usually installed in the longitudinal direction of the column between the two separating walls 2 and 2' and distributors 3 through the packed bed 1, but can be supported by the holding devices 9 together with packed bed 1. The distributing sticks 10 serve as a support for the packing material and thus avoid the concentrated loading of the entire weight of packing material in the bottom portion of the column. To effectively obtain uniform distribution of packing material in the column by the distributing sticks, it is desirable to install the sticks such that the distance between adjacent sticks or rods is less than 1 meter. When this distance is too narrow, the inside structure becomes complicated and the space for packing material may be insufficient. Hence, under the usual circumstances, a distance of more than 10 centimeters is required. As a void uniformity of packing material in a horizontal packed column depends on various factors such as the column diameter, shape and size distribution of packing material, surface smoothness and fragility of packing material, the optimum distance between sticks or rods 10 should be determined by taking these characteristics into account. Since distributing sticks can also be used as a supporting structure for the two separating walls and the distributor of the chamber, the distance between sticks or rods 10 may also be determined on these basis. The distributing sticks can be of any shape such as cylindrical or rectangular, but due to its simplicity and strength the cylindrical shape is most desirable. To avoid any dead space forming under the distributing sticks, providing a short path for flow of fluid, a spindle cross sectional shape of distributing stick can be used. Distributing sticks having an equivalent diameter of 1 to 50 cm are preferred.

When a continuous adsorption operation is attempted using a packed column, it is particularly important that the following conditions be satisfied as to the installation of fluid flow distributors in the column:

1. Since a multi-stage adsorption column has a fairly large ratio of bed diameter to bed depth in order to minimize pressure drop through the column, a special device to make uniform flow distribution is required.

2. Space occupied by the distributor should be minimized so as to avoid fluid contamination caused by the dead space of the distributor.

3. Residence time distribution as well as fluid flow distribution of the fluid must be uniform through the bed including the distributor space.

4. The distributor should have a shape and structure to reduce the column length.

5. Back-mixing within the distributor should be avoided.

6. Pressure drop through the distributor should be minimized.

In the present invention many types of distributor structures can be used such as a guiding plate in the fluid inlet, a tangential introduction of fluid into the cylindrical column, a multi-stage grates distributor, a ring piping with distribution holes, inclined baffle plates and so forth. For a continuous adsorption column consisting of multiple chambers, a certain structure of distributor of cross sectional area which may be adjusted so that the velocity of fluid across the area can be kept constant, is the most desirable. In this structure, the cross sectional areas of the inlet and outlet distributors (or collectors) are reduced as the liquid flow rate across the areas decrease. However, since there are several difficulties in accomplishing perfect constant fluid velocity, various embodiments in design are possible to obtain an approximate constant fluid velocity.

Figure 4:
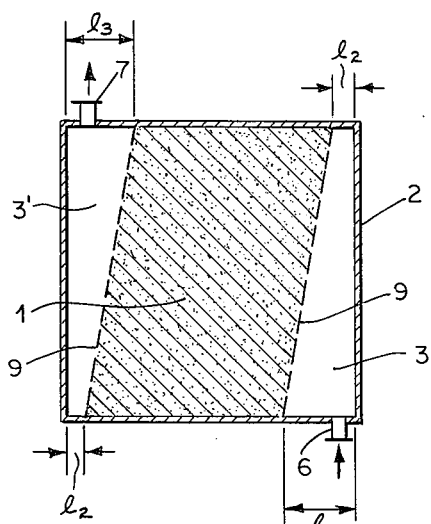
FIG. 4 is an elevational view in cross-section of one part of the column of the present invention showing one form of baffle plate which may be incorporated in this invention.

One of these embodiments is shown in FIG. 4, as an inclined baffle plate.

In FIG. 4 distributors are formed in the chamber by installing an inclined baffle plate in the entrance and exist portions of the chamber. As fluid flows in the distributor, some portion of the fluid flows into the bed, so that total flow rate within the distributor decreases. To keep fluid velocity constant, an inclined baffle plate is employed. Also, a stepwise baffle or curved baffle plate also can be used to make the desired distributor structure. It is important to maintain the ratio of cross sectional area of fluid inlet nozzle to fluid outlet nozzle (Si/So) about $\sqrt{2:1}$. A pressure drop through the distributor is partly caused by expanding of fluid flow from the narrow inlet nozzle to the wide distributor. Another pressure drop is caused by contracting of fluid flow from the wide collector to the narrow outlet nozzle. When the fluid linear velocity is kept constant both in inlet distributor and outlet distributor, pressure drop due to fluid expanding is approximately twice the pressure drop due to fluid contracting. It is important to balance these two pressure drops to establish an uniform fluid flow distribution through the packed bed. To accomplish this purpose effectively, the ratio of sectional area of outlet nozzle to inlet nozzle should be $1/\sqrt{2}$. To reduce the pressure drop through the inlet and outlet nozzles, the cross sectional area of the nozzles should be gradually increased or decreased. For this, rectangular or elliptic piping is useful.

To obtain uniform fluid residence time distribution in the chamber, it was found to be very important to arrange the positions of inlet nozzle and outlet nozzle so that they are symmetric with respect to the middle point of the central axis of the packed bed. It is also very important to arrange the structure if inlet and outlet fluid flow distributors symmetric with respect to said middle point of the central axis. In multi-stage horizontal packed columns of this invention, the inlet and outlet nozzles are attached to the circumference of the column in various ways. The nozzles can be rectangular to the cylindrical chamber axis. It is also possible to attach the nozzles eccentric or tangential to the cylindrical chamber. However, if the symmetry of the nozzles or position of distributors is Observed, complete uniform residence time distribution can be attained.

In commercial multiple stage packed columns, it appears that a horizontal type column has rarely been used. However, with the present invention, horizontal type columns may now possess outstanding characteristics for commercial use in comparison with the convential vertical multiple chamber packed column. These advantages are summarized below:

1. The present invention makes it possible to load and unload packing material of the packed bed easily, quickly and independently at less cost while protecting the packing material from contamination.

2. Foundation cost is less expensive, particularly in a large size plant.

3. Dead space in every part of the packed column can be minimized, which results in significant improvement of process performance.

4. Excellent uniformity of fluid flow distribution as well as fluid residence time distribution can be obtained, which again makes process performance better.

5. Pressure drop through the packed column can be reduced.

As a result, initial investment and running costs of the process is less expensive.

In summary, the present invention can be favorably applied to adsorptive separation processes, and particularly effective in the process which enables the separation of the selectively adsorbed component having a high degree of purity.

The following examples are presented for purposes of clarification of the invention and are not intended to limit the invention to such disclosures.

EXAMPLE I

Figure 3B:
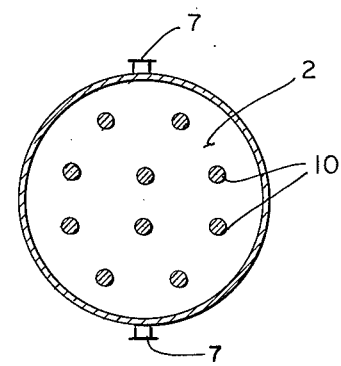

An arrangement, similar to that shown in FIG. 3, involves 90 distributing sticks each having a diameter of 5 cm in the horizontal packed bed chamber at 30 cm spacing between neighboring sticks. The chamber, having an axial length and inner diameter of 2 m and 4.3 m, respectively, was packed with silica particles 0.2 to 1 mm in diameter. Inlet and outlet nozzles of fluid fitted vertically to the circumference of the chamber were placed in symmetry with respect to the middle point of the central axis of the chamber.

Figure 6:
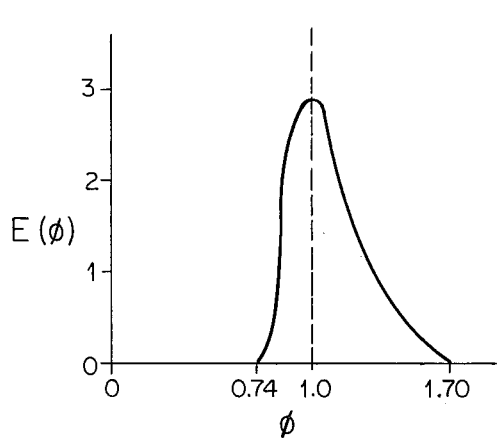
Figure 5:
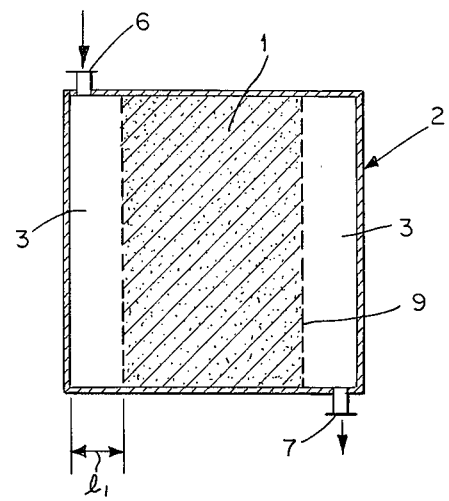
FIG. 5 is another detailed illustration of the column of the present invention.

The inner diameter of each of the nozzles was 8 inches. The shape of the distributor used in this example is shown in FIG. 5. The width of the distributor $l_1$, (referred to in FIG. 5) is 10 cm. The liquid distribution in this chamber was tested by the pulse response curve using NaCl as a tracer material while feeding water to the chamber at a flow rate of 400 m³/Hr. The results are shown in FIG. 6 which indicates an adequate liquid distribution. This response curve almost coincided with the ideal response curve taken from a packed column having a diameter of 2 cm and a length of 2 m which was packed with the same silica as used in this example. It was found very easy to fill this horizontal chamber with silica and it took only 6 hours to complete loading. The volume of the distributors was about 10% of the total volume of the chamber.

EXAMPLE II

Figure 7:
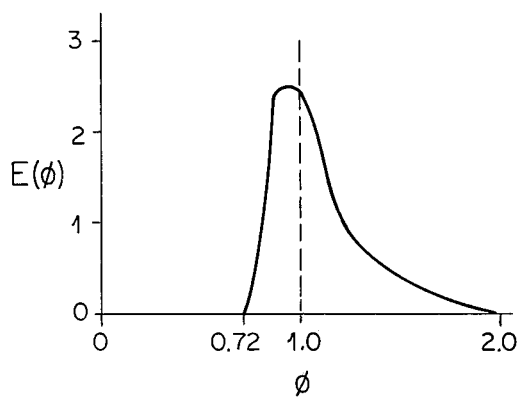

Utilizing the same apparatus as that of Example I, the procedures of Example I were repeated without distributing sticks being placed in the chamber, but with all other conditions remaining substantially the same. The pulse response curve for this example is shown in FIG. 7, which indicates that the bottom part of the bed was packed more tightly than the upper part because of the absence of the distribution sticks and that, accordingly, the liquid linear velocity through the bottom part was slower than that through the upper part.

EXAMPLE III

Utilizing the same apparatus as that of Example I, the procedures of Example I were repeated but with the inlet and outlet nozzles being fitted in the same direction instead of in symmetry, all other conditions remaining substantially the same.

Figure 8:
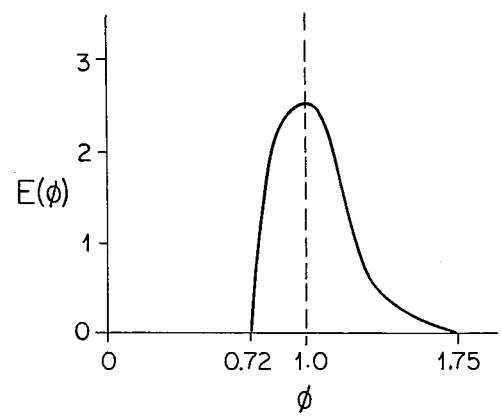

The pulse response curve for this chamber is shown in FIG. 8 which indicates the residence time distribution for this example is much broader than that for Example I.

EXAMPLE IV

Utilizing the same apparatus as that of Example I, the procedures of Example I were repeated but with the inclined baffle distributors shown in FIG. 4, being used all other conditions remaining substantially the same.

The width of the distributor $l_2$ and $l_3$ (referring to FIG. 4) was 1 cm and 9 cm, respectively.

Figure 9:
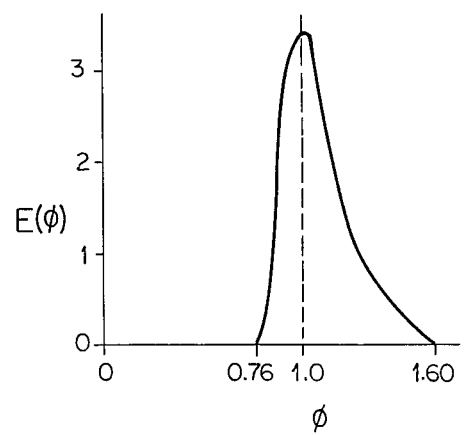

The pulse response curve for this chamber is shown in FIG. 9 which indicates the residence time distribution for this example to be better than that for Example I.

The volume of the distributors was about 5% of total volume of the chamber and it was smaller than that of Example I.

EXAMPLE V

Utilizing the same apparatus as that of Example I, the procedures of Example I were repeated but the ring type perforated tube distributors shown in FIG. 10, were used, all other conditions remaining substantially the same. Liquid was introduced to the inlet nozzle, which was placed in the center of the ring distributor, and was distributed to each ring and then flushed through the nozzles 11 (1 cm$\phi$) in the rings.

The width of distributor $l_4$ (referring to FIG. 10) is 15 cm. The pulse response curve for this chamber is shown in FIG. 11 which indicates that residence time distribution for this chamber is much broader than that for Example IV. The volume of the distributors was about 15% of the total volume of chamber.

EXAMPLE VI

Utilizing the same apparatus as that of Example I, the procedures of Example I were repeated but the size of the inlet nozzle was increased to 10 inches from 8 inches, with all other conditions remaining substantially the same.

The pulse response curve for this chamber is shown in FIG. 12 which indicates that the change in the ratio of cross-sectional area of inlet and outlet nozzles from 1:1 to about $\sqrt{2:1}$ improved the liquid residence time distribution in the chamber.

EXAMPLE VII

Utilizing the same apparatus as that of Example I, the procedures of Example I were repeated but the size of the inlet nozzle was increased to 12 inches from 8 inches and that of the outlet nozzle was reduced to 6 inches from 8 inches, all other conditions remaining substantially the same.

The pulse response curve of this chamber is shown in FIG. 13. In comparison with the results of Examples I, VI and VII, it is concluded that the best ratio of cross-sectional area of inlet and outlet nozzles is $\sqrt{2:1}$.

What is claimed as our invention is:

1. A packed horizontal column for adsorptive separation processes, said column comprising a series of separate chambers arranged substantially in horizontal succession, each of said chambers being horizontally displaced from one another, a plurality of walls separating each said chamber from its neighboring chambers, each of said chambers comprising a bed of packing material supported by a holding device, and each of said chambers having a fluid inlet opening and an inlet distributor at one end thereof, and also having a fluid outlet collector and a fluid outlet opening at the end thereof which is horizontally opposite to said fluid inlet opening, said one end and said opposite end being horizontally displaced from one another therebetween constituting the axis of said chamber, said fluid inlet opening and inlet distributor being symmetrically disposed with respect to said fluid outlet opening and outlet collector about a point on said axis midway between said horizontally opposite ends, each of said chambers further including a group of spaced-apart rods extending substantially horizontally from end to end between said horizontally opposite ends, each of said rods being spaced from the other adjacent rods of the group at a distance of from 0.1 to 1 meter, and the ratio of the cross-sectional area of said fluid inlet to the cross-sectional area of said fluid outlet being about $\sqrt{2}:1$.

2. A packed column, as recited in claim 1, wherein each of said chambers includes openings at the top and bottom thereof for loading and unloading packing material.

3. The horizontal column as claimed in claim 1 which is further characterized in that the cross-sectional areas of the inlet and outlet distributors where fluid passes through are reduced as the liquid flow rate across the areas decreases.

* * * * *